(12) United States Patent
Williamson

(10) Patent No.: US 10,800,107 B1
(45) Date of Patent: *Oct. 13, 2020

(54) PRECISE FAUX WOOD REPRODUCTION SYSTEM AND METHOD

(71) Applicant: Travis Edward Williamson, Thomasville, NC (US)

(72) Inventor: Travis Edward Williamson, Thomasville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,126

(22) Filed: Dec. 12, 2019

Related U.S. Application Data

(63) Continuation of application No. 16/422,884, filed on May 24, 2019, now Pat. No. 10,518,477.

(51) Int. Cl.
| | |
|---|---|
| *B29C 33/38* | (2006.01) |
| *B28B 7/00* | (2006.01) |
| *B29C 64/386* | (2017.01) |
| *E04F 13/08* | (2006.01) |
| *E04F 13/14* | (2006.01) |
| *B33Y 80/00* | (2015.01) |
| *B33Y 50/00* | (2015.01) |

(52) U.S. Cl.
CPC ............ *B29C 64/386* (2017.08); *B28B 7/007* (2013.01); *B29C 33/3835* (2013.01); *B29C 33/3842* (2013.01); *E04F 13/0871* (2013.01); *E04F 13/141* (2013.01); *B29C 2033/385* (2013.01); *B33Y 50/00* (2014.12); *B33Y 80/00* (2014.12)

(58) Field of Classification Search
CPC . B28B 7/007; B29C 33/3842; B29C 33/3835; B29C 64/386; B29C 2033/385; B33Y 50/00; B33Y 80/00
USPC ...................................................... 264/219
See application file for complete search history.

(56) References Cited

U.S. PATENT DOCUMENTS

| | | | | |
|---|---|---|---|---|
| 4,288,954 A * | 9/1981 | O'Donnell | .............. | E04B 1/167 52/233 |
| 5,181,358 A * | 1/1993 | Mead | ...................... | E04B 2/708 52/233 |
| 7,807,083 B2 * | 10/2010 | Scherer | ..................... | B28B 3/08 264/219 |
| 8,172,907 B2 * | 5/2012 | Martinetti | ............. | A61F 2/2875 623/23.56 |
| 8,302,355 B2 * | 11/2012 | Cook | ..................... | B28B 7/007 52/233 |
| 8,387,338 B1 * | 3/2013 | Smith | ..................... | E04F 15/08 264/220 |
| 9,566,742 B2 * | 2/2017 | Keating | ................... | B28D 1/18 |
| 2004/0187411 A1 * | 9/2004 | Clegg | ..................... | E04B 2/702 52/233 |
| 2006/0026919 A1 * | 2/2006 | Morse | ...................... | B44F 9/04 52/506.01 |
| 2009/0113969 A1 * | 5/2009 | Buckley | ................... | B44B 1/04 72/14.8 |
| 2015/0093588 A1 * | 4/2015 | Sadusk | ................. | B29C 64/393 428/480 |

FOREIGN PATENT DOCUMENTS

EP  2965710 A1 * 1/2016  ........... A61C 13/082

* cited by examiner

*Primary Examiner* — Atul P. Khare
(74) *Attorney, Agent, or Firm* — Michael L. Greenberg, Esq.; Greenberg & Lieberman, LLC

(57) ABSTRACT

A system and method for fabricating and installing structure siding with the appearance of logs fashioned from at least one mold configured from digital scans of existing logs of an antiquated log cabin is described. The process facilitates the reuse of scans amounting to digital files representing an existing log cabin structure. Via the system, staff members may craft a recreation of the façade of an existing log cabin numerous times on modern homes without the removal of the original logs, taking out all unwanted imperfections of the existing log cabin structure. A high-definition metrology grade scanner is preferably employed to capture the appearance of the existing log cabin in great detail such that molds may be formed to facilitate its reproduction. Composite façades may be created based on scans of logs derived from a variety of existing log cabins to create a new design.

13 Claims, 4 Drawing Sheets

PRECISE FAUX WOOD REPRODUCTION SYSTEM AND METHOD

CONTINUITY

This application is a continuation patent application of non-provisional patent application Ser. No. 16/422,884, filed on May 24, 2019, and priority is claimed thereto.

FIELD OF THE PRESENT INVENTION

The present invention relates to the field of wood replication via not-wooden materials, and more specifically relates to a system, and method of use thereof, for fabricating precise copies of wooden elements including the manufacturing siding for a structure such as a home which conveys the style and appearance of a historic log cabin based on precise copying of existing wooden logs, wood exhibited in wooden fences, and the like.

BACKGROUND OF THE PRESENT INVENTION

Wood is known to be a quality building material capable of withstanding a great deal of weathering and time when properly maintained. Additionally, wood presents a valuable aesthetic which is unmatched by any competing erecting material. As such, wood is used for a great deal of projects, ranging from farm fencing to log cabins and interior wood paneling. As a result of the prominence of wood, it is relatively expensive to construct and maintain a modern log cabin.

Presently, the realm of home construction and renovation, there is a growing trend to craft the siding of homes to have the appearance of being rustic log cabins externally. Customers want modern conveniences indoors, but wish for their homes to appear as though they are genuine log cabins. In order to achieve this effect, home builders have taken to deconstructing genuine, old log cabins in order to reclaim the wood, and place it, trimmed or as-is, around the perimeter of the walls of the house to provide the appearance that the house is actually constructed with wooden logs. Unfortunately, once entering the structure, it is readily apparent that the house is not a true log cabin, as the interior walls do not depict the other side of the logs.

This process, while effective, is rather expensive which prohibits many customers from pursuing the option. Additionally, despite the expense and work, the logs, once reclaimed, are only used again once, on the new structure. Some companies cut the reclaimed logs in half, as only the front half is needed to provide the appearance of a log cabin but leave the ends of the logs intact as these points are shown externally at the corners of the structure. Still, this ensures that the logs are only able to be used on the single property instance.

If there were a way to reconstruct the antique look of original logs without requiring their actual re-use, the process of achieving the 'log cabin look' would be easier for more customers.

Other techniques have included temporary (or permanent) removal of the log, taking a mold of the log, and then casting the form of a portion or entirety of the log in concrete. However, taking a mold of the log as-is does not allow for the sizing and proportions of the log to be altered to facilitate installation of the casted form onto properties of varying sizes. Additionally, existing methods of crafting a mold based on a wooden log employ numerous coats of latex to provide the detail needed, requiring a large amount of time to accomplish the project.

Thus, there is a need for a method and system by which faux logs can be crafted for placement onto structures to achieve a 'log cabin look' which facilitates the design of logs of varying sizes based on an original log's appearance. Such a system preferably employs high definition scanning technology to obtain three-dimensional scans of logs found on antiquated log cabins (or other desired wood, such as weathered wood fencing) which does not necessitate the removal of the logs from the original structure. Additionally, such a system would be vastly superior to current techniques in the prior art, as, via the three-dimensional scans obtained, the essence of the originally scanned logs may be used countless times on different structures, removing the need to reclaim old wood from log cabins (or other wood sources) altogether.

SUMMARY OF THE PRESENT INVENTION

The present invention is a system and method for crafting siding for a structure which exhibits the features and appearance of a log cabin. The system employs the use of a three-dimensional scanner to capture highly detailed images of an existing log cabin structure to be saved as digital files. After consultation with a customer desiring a log-cabin-like appearance installed to his or her home, a staff member customizes the digital file which removes the imperfections not wanted, including twisting, warping, or bent surfaces off each log. The customized files are then employed to craft molds of each desired log based on the inverse of the modified three-dimensional files. The logs are then cast in concrete using the molds to create concrete logs which perfectly mimic the natural imperfections of the natural wood. The cast concrete logs are installed on the customer's house, then stained to a desired wood color.

Since digital files of the scans of the logs are used, in conjunction with image editing software, the files output may be customized per the desires of the customer. For example, if the customer wishes for the logs to be shorter, wider or longer in order to accommodate his/her structure, the log can be scaled digitally to alter the size and/or appearance of the log to the desired size prior to making forms via 3D printing and/or CNC machining to facilitate the creation of molds. Molds crafted via the system and method of the present invention are preferably approximately two inches deep to for log-alike panel siding. Separate forms are made to facilitate the creation of molds for the corner portions of the façade, which appear as interlocking or dovetailed corners of fully formed cast logs.

It should be noted that the process is similar in the recreation of other wood formats, including fence rungs, fence posts, and other wood elements which a customer may desire to have recreated to appear antiqued to replace authentic rotten/worn-out versions, or which a customer wishes to have a durable fence that appears old and weathered, but in fact is a durable concrete facsimile. Details pertaining to the fabrication of these forms, both antiqued and 'clean' are exhibited in the detailed description.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a system and method of antiqued or new wood replication, including the manufacturing of "wooden" exterior siding, such as that conventionally found on houses and other similar structures. The siding produced is designed to perfectly mimic that of a traditional log cabin, exhibiting the features and appearance of natural hardwood externally. However, it should be noted that the system and method is applicable to other forms of wood replication, such as the creation of antiqued fence posts, rails, and other wooden items.

The system employs the use of at least one high-definition metrology grade scanner, however other suitable three-dimensional scanners could be used in other embodiments of the system. Scans are obtained from existing wooden constructs such as log cabin structures after obtaining (or purchasing) permission from the property owner to perform the non-invasive scan with the scanner. The nature of the scanners employed ensures that the logs need not be removed from the property in order to obtain an accurate and usable scan.

Figure 1:
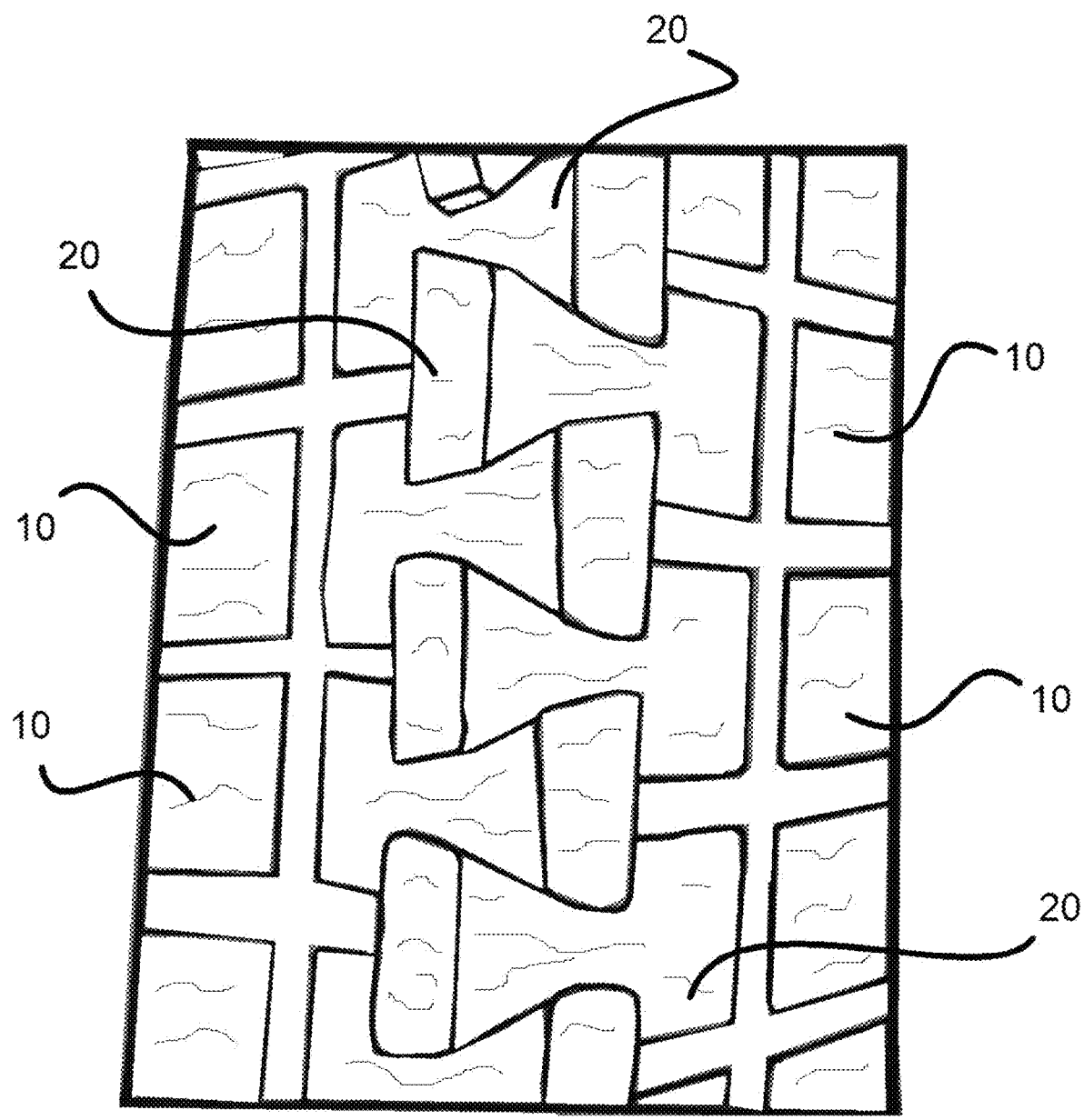
FIG. 1 depicts a view of the preferred embodiment of the present invention as seen from the side, at a corner of siding erected via the system of the present invention.
Figure 2:
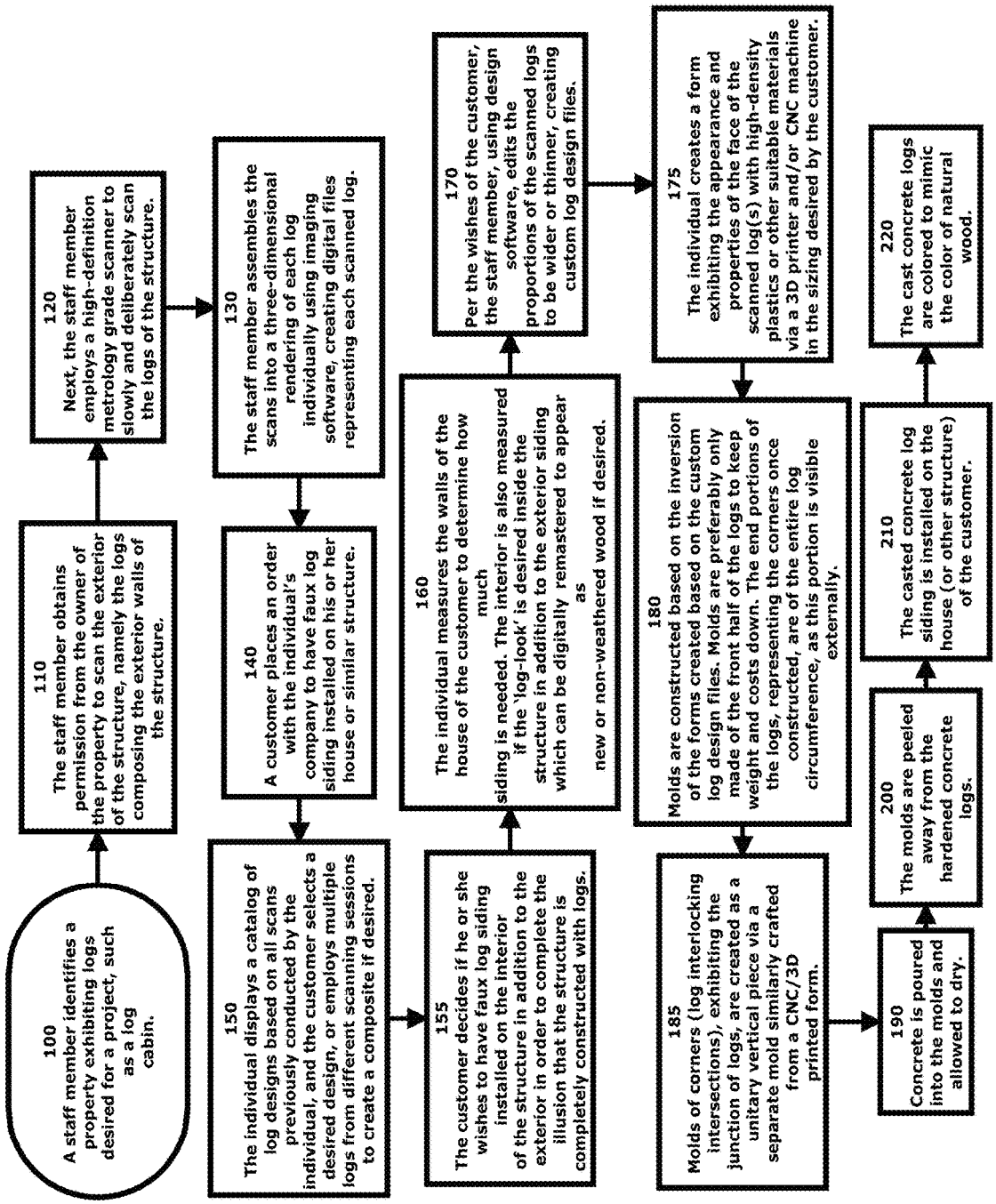
FIG. 2 exhibits a flow chart detailing the process of use of the system of the present invention.
Figure 3:
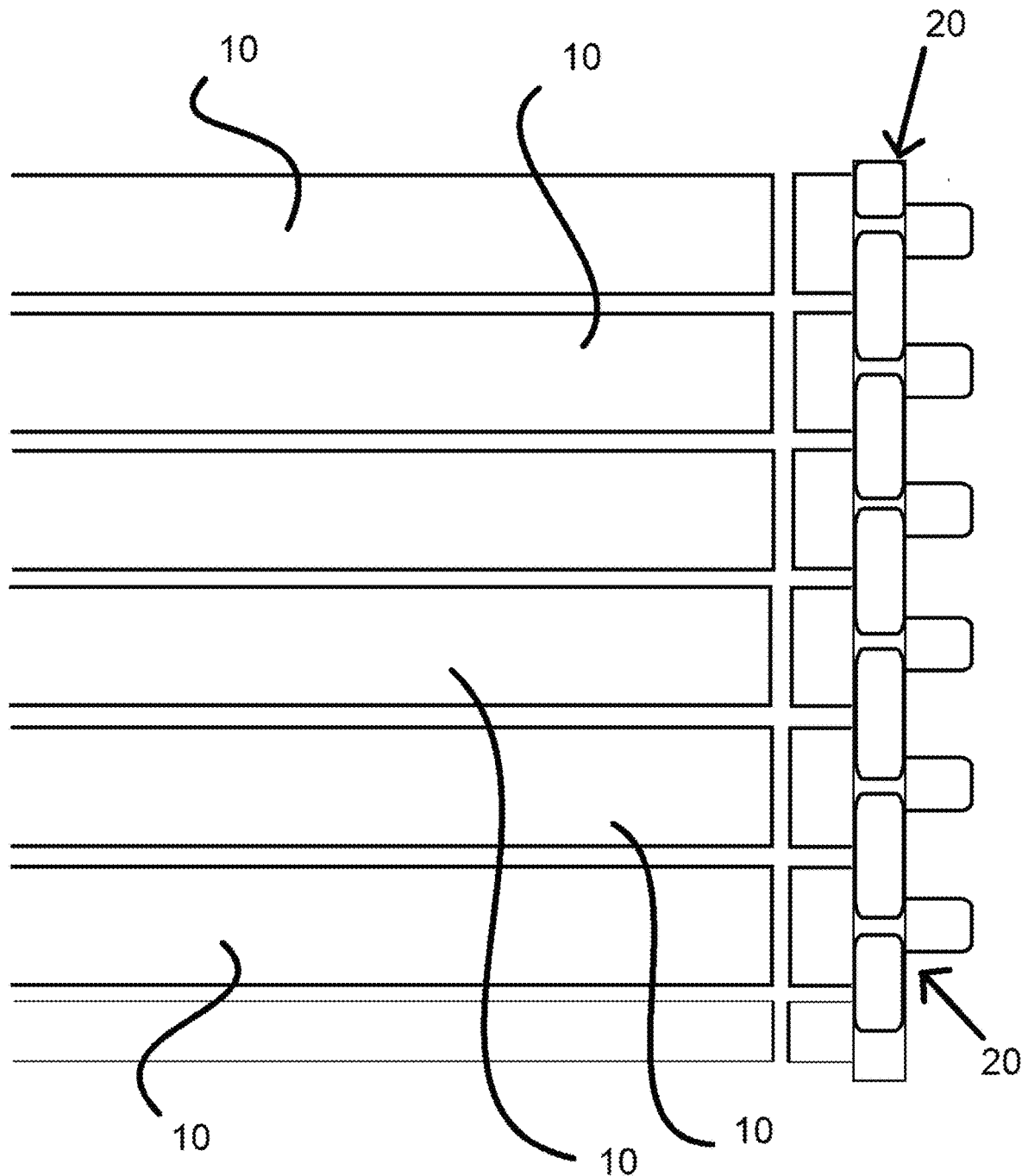
FIG. 3 shows a view of the output of the system of the present invention, depicting the side view of an external corner joint of siding made via the system of the present invention.
Figure 4:
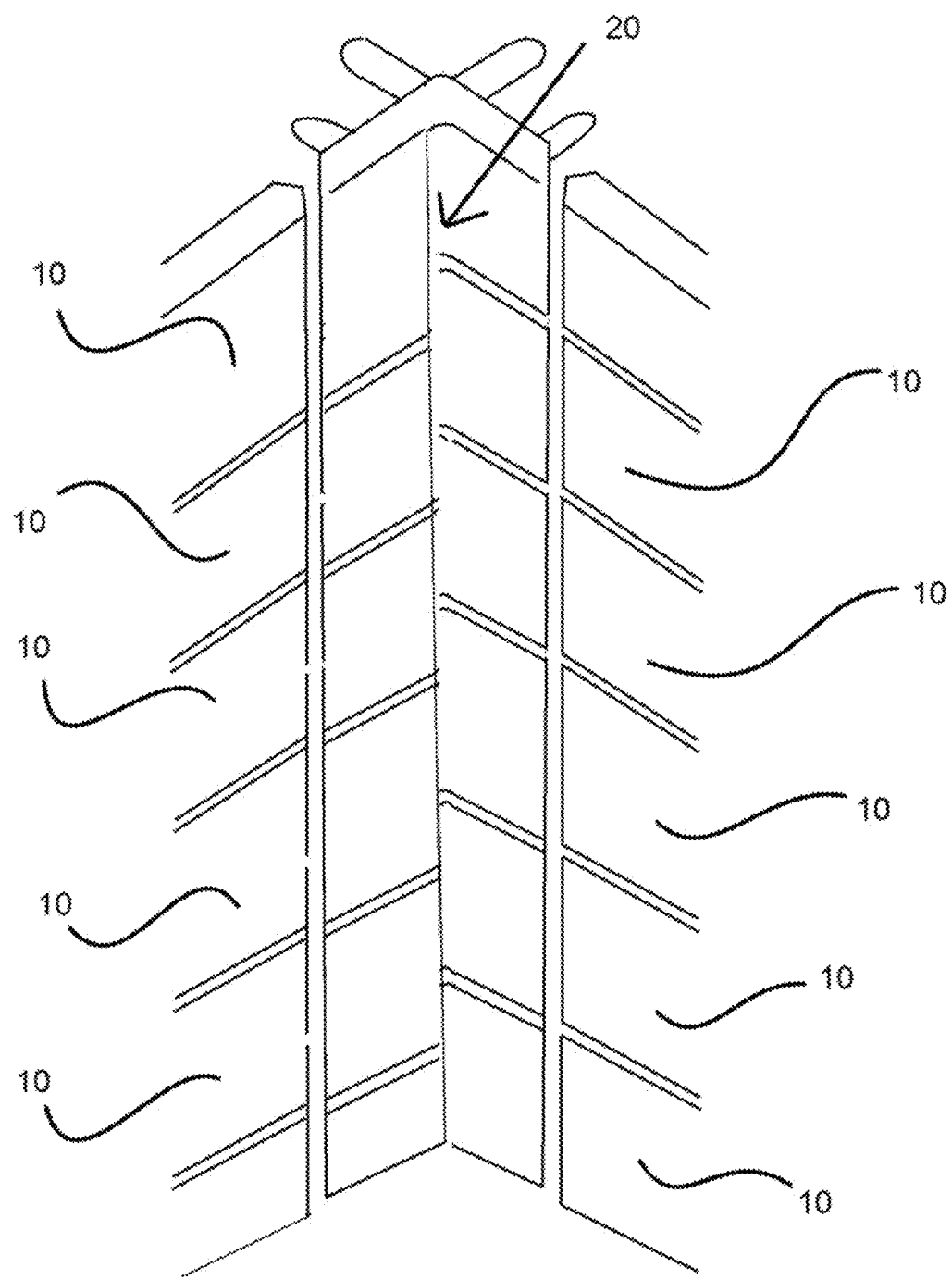
FIG. 4 displays a view of the output of the system of the present invention, showing a top-down view of the corner joint of siding made via the system of the present invention.

The method of the present invention, as detailed in FIG. 2, is preferably as follows:

1. A staff member identifies a property exhibiting logs desired for a project, such as a log cabin. (100)
2. The staff member obtains permission from the owner of the property to scan the exterior of the structure, namely the logs composing the exterior walls of the structure. (110)
3. Next, the staff member employs a high-definition metrology grade scanner to slowly and deliberately scan the logs of the structure. (120)
4. The staff member assembles the scans into a three-dimensional rendering of each log individually using imaging software, creating digital files representing each scanned log. (130) If a scanned log is bowed, twisted, or bent, the individual employs the imaging software to make the log uniform as a good building material. After initial scans are taken, and image files created which are uniform, the individual now has the capacity to manufacture log cabin siding for customers which can be customized to any extent since the files are digital.
5. A customer places an order with the individual's company to have faux log siding installed on his or her house or similar structure. (140)
6. The staff member displays a catalog of log designs based on all scans previously conducted, and the customer selects a desired design, or employs multiple logs from different scanning sessions to create a composite if desired. (150) As each scanned log is unique having different hue marks and knots, users may wish to customize the appearance of their desired siding.
7. The customer decides if he or she wishes to have faux log siding installed on the interior of the structure in addition to the exterior in order to complete the illusion that the structure is completely constructed with logs. (155)
8. The staff member measures the walls of the house of the customer to determine how much siding is needed. The interior is also measured if the 'log-look' is desired inside the structure in addition to the exterior siding which can be digitally remastered to appear as new or non-weathered wood if desired. (160)
9. Per the wishes of the customer, the staff member, using design software, edits the proportions of the scanned logs to match that of the measurements of the house, and/or be wider or thinner, creating custom log design files. (170) The custom log design files are thinner, or wider than the originally scanned log(s) according to the desire and need of the customer. This is not offered with any current system.
10. The individual creates a form exhibiting the appearance and properties of the face of the scanned log(s) with high-density plastics or other suitable materials via a 3D printer and/or CNC machine in the sizing desired by the customer, (175)
11. Molds are constructed based on the inversion of the forms created based on the custom log design files. Molds are preferably only made of the front half of the logs to keep weight and costs down. The end portions of the logs, representing the corners once constructed, are of the entire log circumference, as this portion is visible externally. (180) The molds are approximately two inches deep for the primary siding, and are preferably ten feet in length. However, it should be understood other lengths and sizes may be cast. Molds are preferably made with a chemical resistant rubber to ensure the mold may be reused over 100 times.
12. Molds of corners (log interlocking intersections), exhibiting the junction of logs, are created as a unitary vertical piece via a separate mold similarly crafted from a CNC/3D printed form. (185) The form amounts to several interlocking logs in accordance with the height requirements of the customer's project. A finished corner (20) can be seen in FIG. 1 adjacent to cast wood (10) representing siding on a structure.

13. Concrete is poured into the molds and allowed to dry. (190) Rebar and grid wire are incorporated into the pour to reinforce the concrete. The concrete is properly oxygenated in order to ensure minimal (if any) cracking occurs, and to ensure outdoor longevity.

14 The molds are peeled away from the hardened concrete logs. (200)

15. The casted concrete log siding is installed on the house (or other structure) of the customer. (210)

16. The cast concrete logs are colored to mimic the color of natural wood. (220) Coloring is preferably accomplished via a concrete reactive stain, but may be used with integral coloring accompanied by release coloring to provide contrast.

Installation to the house or other structure requires additional steps, many of which are conventional in the application of siding. For example, a building wrap is applied, the windows and doors are flashed out, and a rain screen is applied. A small air void is left to remain behind the wall, and a second layer of waterproofing is placed behind the front layer. A metal lathe is placed against the rain screen. The rain screen ensures that any wet mortar does not come into contact with the building wrap. A weep screen is preferably disposed at the bottom, which allows air to circulate, preventing moisture issues down the line for the customer.

After the siding is cast, it should be noted that the siding is preferably stored vertically in a tray system which facilitates easy transit of the siding to the job site without breakage. Similarly, as the siding is cast in reinforced concrete, it may be stored outdoors until it is needed (ordered) unlike other forms of siding.

It should be noted that, in the event that the customer does not like a given design presented by the staff member, the customer may work with the staff member to create a custom design. Such a custom design is configured as a composite from multiple scanned log cabins in order to obtain the customer's desired look.

Additionally, it should be understood that the three-dimensional digital files based on the scans taken of the original logs may be reused for future customers, eventually removing the need to scan additional original log cabin properties. Such digital files are preferably stored in a database to serve as a form of catalog for customers to peruse prior to purchase. It is the intent of the present invention to remove the requirement of physically dismantling an existing log cabin structure to reuse the logs, or to physically cast molds of the logs, saving a great deal of time. It is additionally envisioned that the digital files may themselves be a product, as an owner of an old log cabin may wish to have a backup of the appearance of the cabin to facilitate later reconstruction if anything were to ever damage or destroy a priceless antique cabin (such as a fire, tornado, etc).

It should be noted that the above delineated process is similarly performed for other wooden formats, including wooden fence posts and beams, and that the finished product is preferably made available in both a weathered and a 'clean' version as determined by the desires of the end customer.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method of manufacturing faux components, the method comprising:
    identifying a desired authentic wooden component forming part of an original structure;
    scanning the desired authentic component with a three-dimensional scanner without removing the component from the original structure, the three-dimensional scanner creating a 3D image file depicting a representation of the authentic component;
    exporting the 3D image file to a computer;
    using the computer to ensure that the representation is uniform by removing imperfections therefrom, thereby forming a modified representation of the component;
    placing a 3D printer in communication with the computer;
    using the 3D printer to print a form exhibiting the appearance and properties of the authentic component and in a desired size in accordance with the modified representation;
    constructing a mold based on the form;
    pouring concrete into the mold;
    incorporating rebar and grid wire into the concrete within the mold;
    drying the concrete to form a cast of a faux component comprising the rebar and grid wire; and
    removing the cast of the faux component from the mold to reveal a completed faux component.

2. The method of claim 1, wherein the mold exhibits the front façade of the faux component.

3. The method of claim 1, wherein the original structure is a log cabin, the authentic component is a log of the log cabin, and the faux component is configured for use as siding on a structure so as to replicate the appearance of a log cabin.

4. The method of claim 1, wherein the original structure is a fence, and the authentic component is a fence post or rung.

5. The method of claim 1, wherein the original structure is selected from the group consisting of a log cabin exterior, a log cabin interior, and a wooden fence.

6. The method of claim 1, wherein the faux component is selected from the group consisting of a faux wooden log, a faux wooden fence post, a faux wooden fence rung, a faux wooden rail, and a faux wooden interior panel.

7. The method of claim 1, further comprising storing the 3D image file in a database among a catalog of designs from which customers may select for manufacture of a desired faux component.

8. The method of claim 1, wherein the computer comprises image editing software configured to scale the representation digitally so as to alter the size and/or appearance thereof.

9. The method of claim 1, wherein the form is constructed from high-density plastics and is subjected to CNC milling prior to said mold construction therefrom.

10. The method of claim 1, wherein the mold is constructed from chemical resistant rubber and may be reused over 100 times.

11. A method of manufacturing faux components, the method comprising:
- identifying a desired authentic wooden component forming part of an original structure;
- scanning the desired authentic component with a three-dimensional scanner without removing the component from the original structure, the three-dimensional scanner creating a 3D image file depicting a representation of the authentic component;
- exporting the 3D image file to a computer;
- using the computer to ensure that the representation is uniform by removing imperfections therefrom, thereby forming a modified representation of the component;
- placing a 3D printer in communication with the computer;
- using the 3D printer to print a form exhibiting the appearance and properties of the authentic component and in a desired size in accordance with the modified representation;
- constructing a mold based on the form;
- pouring concrete into the mold; and
- drying the concrete to form a cast of a faux component.

12. The method of claim 11, wherein the mold is made of a rubber which may be reused.

13. The method of claim 11, wherein the mold is reusable.

* * * * *